US007261932B2

(12) United States Patent
Kennedy

(10) Patent No.: US 7,261,932 B2
(45) Date of Patent: Aug. 28, 2007

(54) COMPOSITE STRUCTURAL LAMINATE PLATE CONSTRUCTION

(75) Inventor: Stephen J. Kennedy, Ottawa (CA)

(73) Assignee: Intelligent Engineering (Bahamas) Limited, Nassau (BS)

( * ) Notice: Subject to any disclaimer, the term of this patent is extended or adjusted under 35 U.S.C. 154(b) by 816 days.

(21) Appl. No.: 10/138,919

(22) Filed: May 3, 2002

(65) Prior Publication Data

US 2002/0187320 A1  Dec. 12, 2002

Related U.S. Application Data

(63) Continuation of application No. PCT/GB00/04198, filed on Nov. 2, 2000, and a continuation-in-part of application No. 09/476,072, filed on Feb. 1, 2000, now Pat. No. 6,706,406, which is a continuation-in-part of application No. 09/053,551, filed on Apr. 1, 1998, now abandoned, which is a continuation of application No. 08/746,539, filed on Nov. 13, 1996, now Pat. No. 5,778,813.

(30) Foreign Application Priority Data

Nov. 5, 1999 (GB) ............................. 9926333.7
Oct. 3, 2000 (GB) ............................. 0024183.6

(51) Int. Cl.
*B32B 15/06* (2006.01)
(52) U.S. Cl. ............... 428/156; 428/138; 428/158; 428/161; 428/162; 428/164; 114/355; 114/356; 114/357
(58) Field of Classification Search ............... 428/70, 428/73, 75, 117, 138, 156, 158, 161, 162, 428/163, 164, 167; 114/69, 74 A, 355, 356, 114/357; 52/782.1, 783.1, 783.12, 783.14, 52/794.1; 14/73
See application file for complete search history.

(56) References Cited

U.S. PATENT DOCUMENTS

| 3,435,470 | A | | 4/1969 | Krenzler |
| 3,732,138 | A | | 5/1973 | Almog |
| 3,783,082 | A | | 1/1974 | Almog .................... 161/37 |
| 4,021,982 | A | * | 5/1977 | Kotcharian ............... 52/410 |
| 4,061,815 | A | | 12/1977 | Poole, Jr. |
| 4,100,860 | A | | 7/1978 | Gablin et al. |
| 4,468,431 | A | | 8/1984 | Okey ................. 428/317.7 |

(Continued)

FOREIGN PATENT DOCUMENTS

CH          690447          9/2000

(Continued)

OTHER PUBLICATIONS

Abstract of Japanese Patent Application No. 61029534.

(Continued)

*Primary Examiner*—Alicia Chevalier
(74) *Attorney, Agent, or Firm*—Darby & Darby

(57) ABSTRACT

A composite structural laminate plate construction comprises two outer metal layers, a form between them and an elastomer layer bonded to the outer metal layers and filling the space between them other than that occupied by the form. The form may be foam and may be in partial contact with the metal layers.

28 Claims, 2 Drawing Sheets

U.S. PATENT DOCUMENTS

| | | | |
|---|---|---|---|
| 4,593,449 A | 6/1986 | Meray-Hovarth et al. | 29/527.1 |
| 4,698,278 A | 10/1987 | Prang | |
| 4,739,722 A | 4/1988 | Rogstad | |
| 4,851,271 A | 7/1989 | Moore, III et al. | |
| 4,940,360 A | 7/1990 | Weholt | |
| 4,992,323 A | 2/1991 | Vogelesang et al. | |
| 5,030,488 A | 7/1991 | Sobolev | |
| 5,218,919 A * | 6/1993 | Krulikowski et al. | 114/74 A |
| 5,219,629 A | 6/1993 | Sobolev | |
| 5,778,813 A | 7/1998 | Kennedy | 114/74 A |
| 5,794,402 A | 8/1998 | Dumlao et al. | |
| 5,834,105 A | 11/1998 | White et al. | 428/297 |
| 6,050,208 A | 4/2000 | Kennedy | 114/74 A |
| 6,145,466 A * | 11/2000 | Herbein et al. | 114/356 |
| 6,239,187 B1 | 5/2001 | Hatke et al. | |
| 6,630,249 B2 * | 10/2003 | Kennedy | 428/625 |
| 6,706,406 B1 * | 3/2004 | Kennedy | 428/423.1 |
| 2001/0035266 A1 * | 11/2001 | Kennedy | 156/331.4 |
| 2002/0187320 A1 * | 12/2002 | Kennedy | 428/209 |

FOREIGN PATENT DOCUMENTS

| | | |
|---|---|---|
| DE | 3005015 A1 | 8/1981 |
| EP | 193182 | 2/1986 |
| EP | 441 443 | 8/1991 |
| EP | 0 441 443 B1 | 5/1994 |
| EP | 1 072 505 A1 | 1/2001 |
| FR | 2305559 | 10/1976 |
| GB | 954907 | 4/1964 |
| GB | 1 221 134 | 2/1971 |
| GB | 2107247 | 4/1983 |
| GB | 2337022 | 11/1999 |
| GB | 2355957 | 5/2001 |
| JP | 4-307232 A | 10/1992 |
| JP | 4-307233 A | 10/1992 |
| JP | 5-50553 A | 3/1993 |
| JP | 5-50554 A | 3/1993 |
| JP | 5-138802 A | 6/1993 |
| JP | 5-229054 A | 9/1993 |
| JP | 5272103 | 10/1993 |
| RU | 2001781 C1 | 10/1993 |
| RU | 2002634 | 11/1993 |
| WO | WO 99/64234 | 12/1999 |
| WO | WO 00/59718 | 10/2000 |
| WO | WO 01/12499 | 2/2001 |

OTHER PUBLICATIONS

Jeffrey L. Sevart et al., Flammability and Toxicity of Composite Materials for Marine Vehicles, Naval Engineers Journal, Sep. 1990, pp. 45-54.

Josef Linder, Development and Behavior of Advanced Double Hull Sandwich Plate Systems: Experimental Investigation, Masters Thesis, Carlton University, Ottawa, Canada, Aug. 1995.

* cited by examiner

COMPOSITE STRUCTURAL LAMINATE PLATE CONSTRUCTION

CROSS REFERENCE OF PRIOR APPLICATIONS

This application is a Continuation of International Patent Application No. PCT/GB00/04198, filed Nov. 2, 2000, which was published under PCT Article 21(2) in English, the entire disclosure of which is hereby incorporated by reference. In addition, this application is also a Continuation-in-Part of pending U.S. patent application Ser. No. 09/496,072, filed Feb. 1, 2000, for COMPOSITE STEEL STRUCTURAL PLASTIC SANDWICH PLATE SYSTEMS, now U.S. Pat. No. 6,706,406, which is a Continuation-in-Part of U.S. patent application Ser. No. 09/053,551, filed on Apr. 1, 1998, for COMPOSITE STEEL STRUCTURAL PLASTIC SANDWICH PLATE SYSTEMS, now abandoned, which is a continuation of U.S. patent application Ser. No. 08/746,539, filed Nov. 13, 1996, for COMPOSITE STEEL STRUCTURAL PLATE SYSTEMS, now U.S. Pat. No. 5,778,813, the entire disclosure of which is hereby incorporated by reference.

FIELD OF THE INVENTION

The present invention relates to a composite structural laminate sandwich plate constructions and particularly to such constructions that are suitable for building both maritime and civil structures or components in which the traditional method of construction uses stiffened steel or metal plates.

BACKGROUND OF THE INVENTION

In applications such as ship hulls or bridge decks, the steel plates forming such constructions are generally stiffened to increase stiffness and strength by preventing localised plate buckling. The stiffeners may be comprised of plates, cold formed or rolled sections that are welded orthogonally to the main load bearing plate. These are generally equally spaced and may be oriented in one or two directions that are aligned with the plan dimensions of the main plate. The number, size, location and type are dependent on the application and the forces that must be carried by the structure. The use of stiffeners requires welding, complicates the manufacturing process and adds weight. Stiffeners, their connection to the main plate or intersection with other main framing members are often the source of fatigue and corrosion problems. Complex and congested structures that result from combining stiffened plates are often difficult to maintain and to provide adequate corrosion protection.

Metal-foam laminates with improved sound or heat insulating properties ate known for use in cladding or roofing buildings, see for example U.S. Pat. No. 4,698,278. Such laminates generally employ foamed or fibrous materials and are not intended to, nor capable of, bearing significant loads, i.e. significantly greater than self-weight and small loads due to localised wind or snow action. Not withstanding, the use of a steel-polyurethane foam-steel sandwich was investigated for use in hulls in ships. It was concluded that this type of sandwich construction was unsuitable as it did not have sufficient bond strength to provide equivalent in-plane or transverse stiffness and strength to stiffened plate structures that is required to carry the applied loads.

GB-A-2 337 022 discloses the use of an intermediate layer comprised of an elastomer located between and adhered to the inner surfaces of first and second metal layers.

SUMMARY OF THE INVENTION

The present invention provides a structural laminate member comprising:
a first metal layer having a first inner surface and a first outer surface;
a second metal layer having a second inner surface and a second outer surface, the second metal layer being spaced apart from said first metal layer;
a form located between said first and second inner surfaces; and
an intermediate layer comprised of an elastomer located in the spaces between said first and second inner surfaces not occupied by said form and adhered to said first and second inner surfaces.

The first and second metal layers may be regarded as face plates of the construction. They also need not be parallel and can have variable spacing or shape to provide the appropriate or best possible structural behaviour.

The structural laminate member of the present invention exhibits reduced average density compared to the prior art and is particularly advantageous in applications such as ships or bridge decks or other structures applications where weight concerns are acute and where welding between metal layers may be eliminated to reduce cost and connection problems for dissimilar metals. Furthermore, by providing a hollow form, internal distribution of wiring or piping through the laminates can easily be provided. Compared to traditional stiffened steel plates, this form of construction provides equivalent in-plane and transverse stiffness and strength, reduces fatigue problems, minimises stress concentrations, improves thermal and acoustical insulation, and provides vibration control. The laminate provides a structural system that acts as a crack arrest layer and that can join two dissimilar metals without welding or without setting up a galvanic cell.

The form is considered to be non-load bearing and is considered to simply provide accurately shaped, spaced and dimensioned volumes in which the elastomer core is not required for structural performance. The space not occupied by the form is filled with elastomer. The quantity, shape, and location of the elastomer between the metal plates is application specific and is designed to function integrally with the metal face plates to carry all the forces that the composite structural laminate plate may be subjected to. It is anticipated that sufficient bond area between the elastomer and the metal plates be provide to transfer the applicable shear forces. In some applications welding of intermediate metal plates or sections may be eliminated. Furthermore, the intermediate layer should be designed and have material characteristics (i.e., yield strength, modulus, ductility, hardness, rebound resilience, thermal and acoustical characteristics, dampening and vibration characteristics) to provide the structural performance required for the given application. For example where the ability to withstand impact loads and absorb energy is important, the intermediate layer will be designed to promote strain dissipation and inelastic membrane action in the metal face plates and to increase puncture resistance.

Embodiments of the invention may include metal plates or sections embedded in and bonded to the intermediate layer to increase shear, flexural and transverse stiffness and to enhance load distribution. The location, size and number are chosen depending on the load and structural requirements. The plates or sections may be oriented longitudinally or transversely or both. Providing extra stiffness in this way has the advantage that the additional plates or sections do not need to be welded to the metal layers; shear transfer between the metal plates or sections and the metal layers is provided through the bond between the elastomer (primarily) and form (secondarily) and the metal plates or sections.

The present invention provides a method of making a structural laminate member comprising the steps of:

providing first and second layers in a spaced apart relationship with a form partly in contact with both metal layers located in a core cavity defined between the two plates, said form partially filling said core cavity;

casting an uncured elastomer into said core cavity; and curing said elastomer so that it adheres to said metal layers.

Providing the form in contact with the metal layers allows laminates to be assembled easily within the required dimensional accuracy.

BRIEF DESCRIPTION OF THE DRAWINGS

Exemplary embodiments of the invention will be described below with reference to the accompanying drawings, in which.

DETAILED DESCRIPTION

In the figures, like parts are identified by like numerals.

Figure 1:
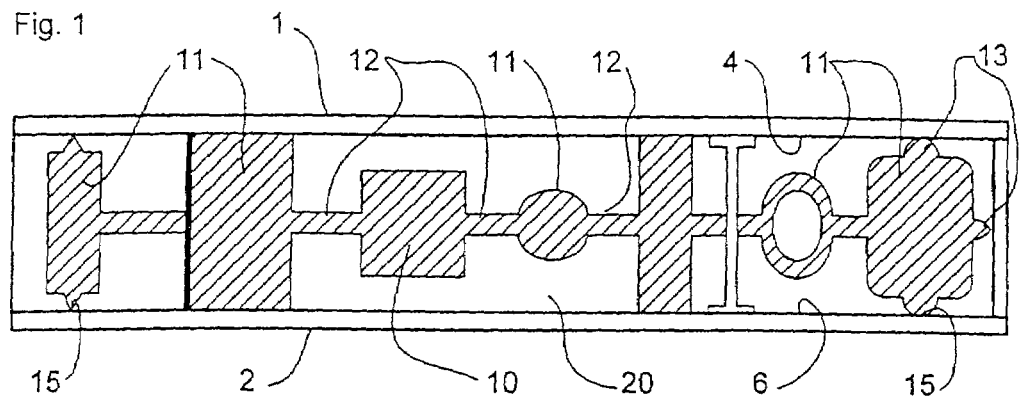
FIG. 1 is a lateral cross-sectional schematic diagram of a composite structural laminate construction according to the invention showing several different forms.
Figure 2:
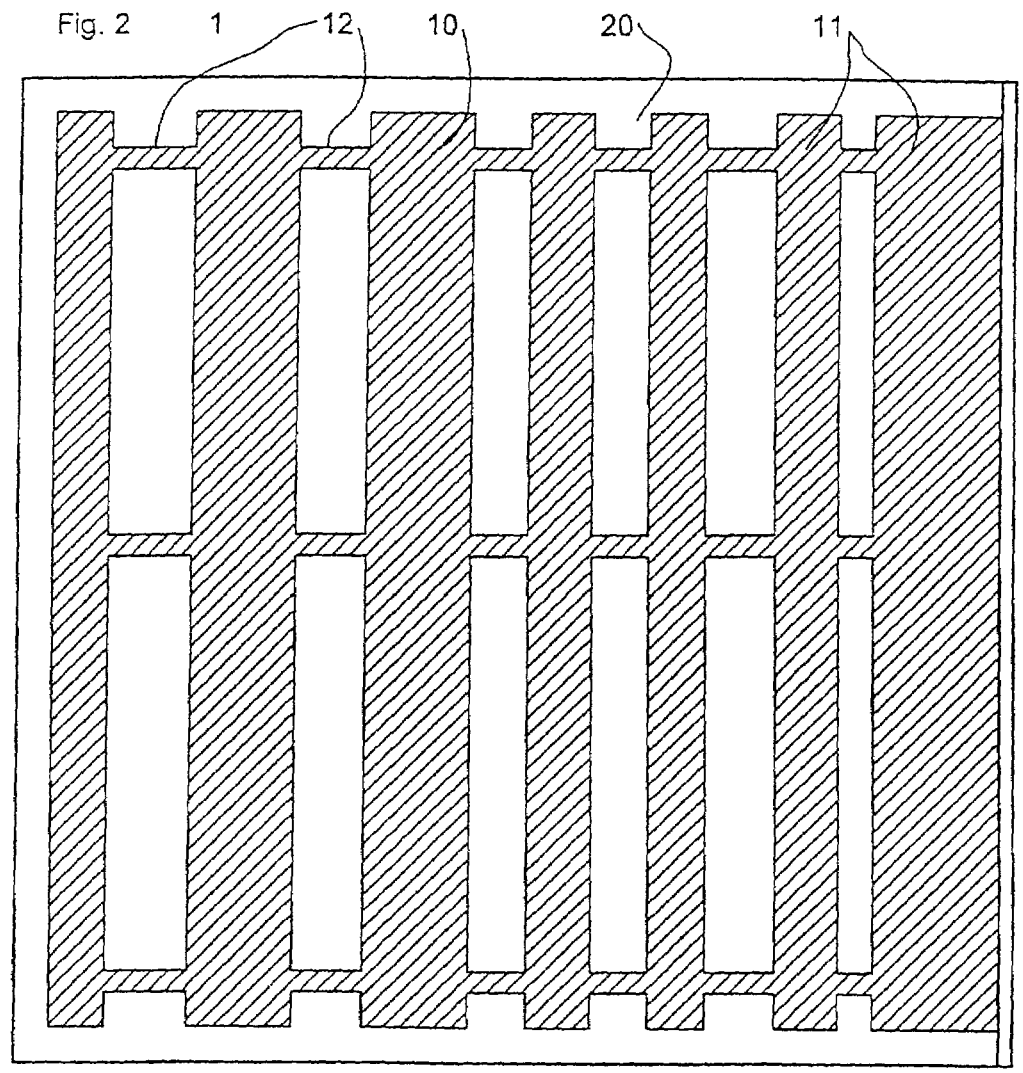
FIG. 2 is a longitudinal cross-section of the same composite structural laminate construction according to the present invention.

FIG. 1 is a cross-sectional view of a laminate member according to the present invention. The laminate member comprises a first outer layer 1, a form 10, an intermediate layer 20 and a second outer layer 2. The form 10 may be in part contact with the outer layers 1 and 2 at areas marked 15. The intermediate layer 20 is bonded to each of the first and second outer layers 1 and 2 with sufficient strength to transfer shear loads between the outer layers so as to form a composite structural member capable of bearing loads significantly greater than self-weight.

The precise load to be borne by the laminate member will depend on the application to which it is to be put. The ratio of volume of form 10 to volume of intermediate layer 20 is selected in accordance with the required physical properties. Such physical properties might include strength, stiffness or density.

Figure 3:
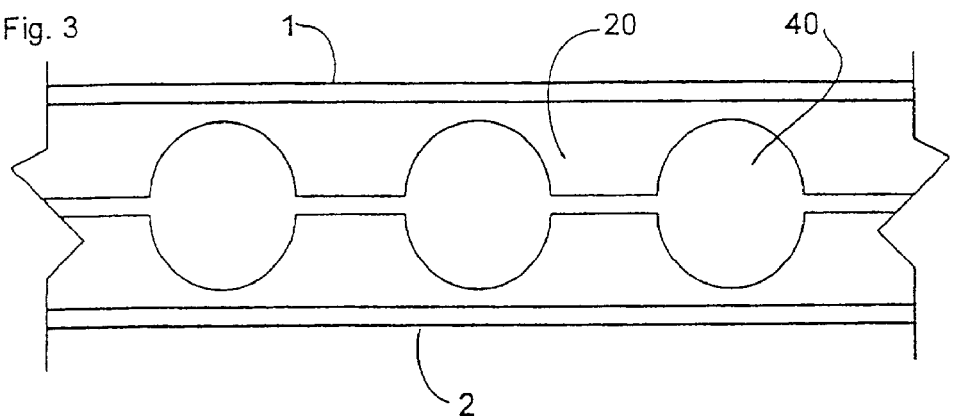
FIG. 3 is a cross-sectional view of a second embodiment of the invention.
Figure 4:
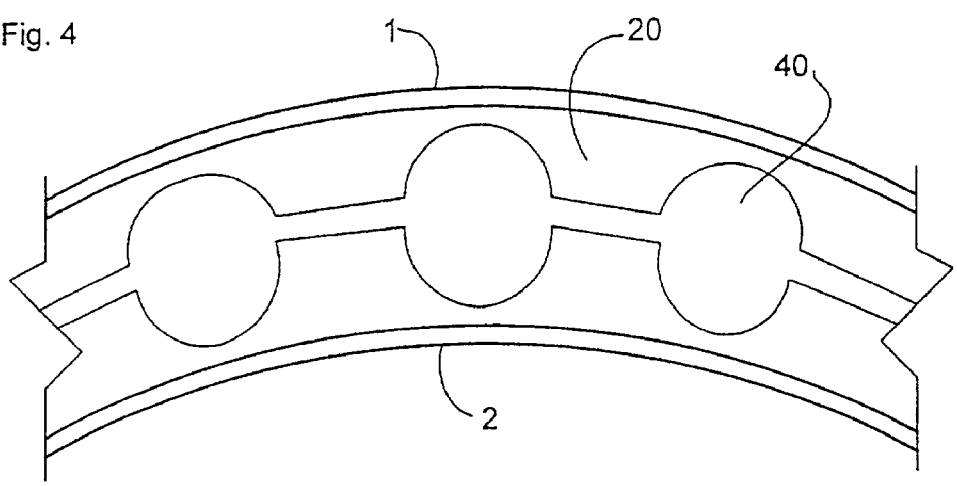
FIG. 4 is a cross-sectional view of a third embodiment of the invention with a curved section.

The form 10 comprises several sub-sections 11 interconnected by interconnectors 12. The sub-sections 11 are generally of the same shape and are evenly spaced as illustrated in FIG. 3 or 4 for flat or curved sections. The interconnectors 12 are generally, though not necessarily parallel to the metal layers 1, 2. The interconnectors 12 generally have a smaller maximum cross-section than the sub-sections 11. Preferably, several sub-sections 11 and interconnectors 12 are integrally made. The form 10 may contact the first and second outer layers 1, 2 along the entire edge of a sub-section 11 or at alignment dimples 13. In the latter case, more surface area is available for the intermediate layer 20 to bond to the first and second layers.

Preferably there are continuous paths through and avoiding the form 10 from the first outer layer 1 to the second outer layer 2. More preferably, there are straight paths through and avoiding the form 10 from the first outer layer (face plate) 1 to the second outer layer (face plate) 2 which are optimally perpendicular to the first and second outer layers. The form may be shaped to additional bonded area for the elastomet at the metal face plates. For example a cross-section of the construction would show a series of elastomer ribs that look like Ionic columns (columns with capitals).

The form 10 may be made of any type of light weight foam material, e.g. polyurethane (PU) foam, which does not react with the metal layers 1, 2 or with the elastomer. The preferred foam is a polypropylene semi-rigid foam with a density of greater than 20 kg/m$^3$. Preferably the form is sufficiently rigid so as not to be easily compressed by the metal layers 1, 2 or the intermediate layer 20. The form 10 may be moulded for a specific purpose or constructed in a generic manner for specific thicknesses such that the form 10 could be sized (cut) to fit. Several forms could be positioned adjacent each other between single outer layers. Other embodiments would replace the forms with other materials like wood and light gauge cold formed steel boxes. These forms would perform the same functions and would have similar attributes to those previously described for the forms 10. These forms may also increased shear and flexural stiffness.

As can be seen from FIG. 3 or 4, the form 10 may be comprised of a regular array of sub-sections interconnected at regular intervals. A structural laminate manufactured in this way will show uniform properties across the whole member. Alternatively, as shown in FIG. 1, the size, shape, and spacing of the sub-sections may be varied. The interconnectors 12 do not necessarily need to be uniformly spaced either. Any shape of sub-section 11 and indeed even hollow shapes can be chosen. These variables are chosen according to the required physical properties of the member in a particular area. The provision of hollow interconnectors 12 or hollow elongated sub-sections 11 allows internal distribution of wiring or piping.

The function of the form 10 is not in a load-bearing capacity, but rather it is a convenient way of providing voids in the intermediate layer 20 in areas where the whole load-beating capacity of elastomer 20 in the space between the first inside surface 4 and the second inside surface 6 is not required. In this way, the density of a given structural member can be greatly reduced. Furthermore, the position of the void within the structural laminate member can be accurately controlled and the dimensional accuracy of the distance between the first inside surface 4 and the second inside surface 6 can be increased.

The first outer layer 1 includes a first outer surface 3 and a first inner surface 4. Similarly, the second outer layer 2 includes a second outer surface 5 and a second inner surface 6. The first inner surface 4 and the second inner surface 6 may be spaced apart in a range of about 20 to 250 mm. At a minimum, the first and second outer layers will have a thickness of 2 mm and the intermediate layer 20 mm. Preferably, the intermediate layer has a modulus of elasticity, E, of at least 250 MPa, more preferably 275 MPa, at the maximum expected temperature in the environment in which the member is to be used. In ship building applications this may be 100 degrees C. The elastomer should not be too stiff so that E should be less than 5000 MPa at the lowest expected temperature, −40 or −45 degrees C. in ship building applications.

If additional shear or flexural stiffness is required for a specific application, metal plates or rolled sections may be cast integrally with or bonded to either the form or the elastomer. The location, size and number are chosen depending on the load and structural requirements. The plates or sections may be oriented longitudinally or transversely or both.

The tear, compression and tensile strengths as well as the elongation of the elastomer should be maximised to enable the composite laminate to absorb energy in unusual load events, such as impact. In particular, the compressive and tensile strengths of the elastomer should be at least 2, and preferably 20 MPa, and more preferably 40 MPa. The compressive and tensile strengths can, or course, be considerably greater than these minima.

Figure 5:
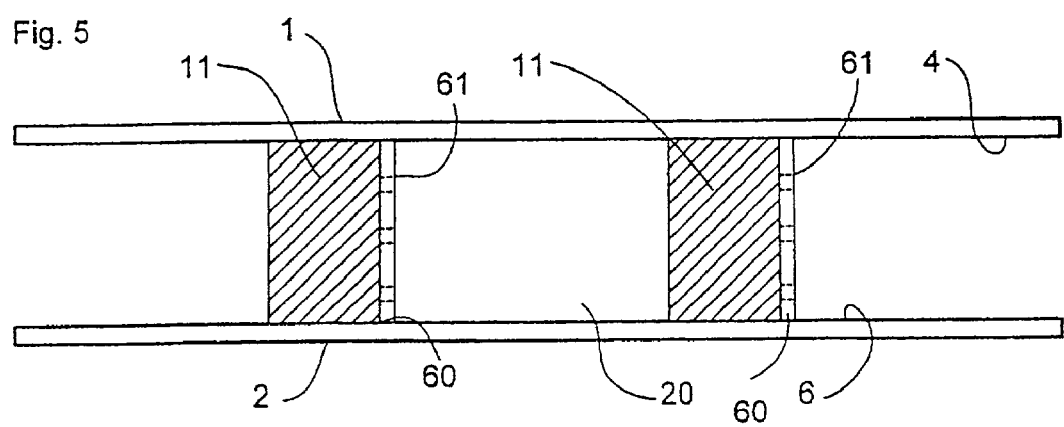
FIG. 5 is a cross-sectional view of a fourth embodiment of the invention.

FIG. 5 shows a further embodiment of the present invention in which shear plates 60 extend between the first and second outer layers 1 and 2. The shear plates 60 may be solid or perforated with punched holes 61 as illustrated in FIG. 5, to allow free flow of the injected intermediate layer 20 and after curing to increase the load (mechanical interlock) between the intermediate layer 20 and the shear plates 60. Perforated plates provide stiffer members, reduced slenderness and reduced weight of component. Preferably the shear plates 60 are located adjacent from sub-sections 11 as illustrated in FIG. 5. Those sub-sections 11 preferably extend for substantially all the length of the member so that the intermediate layer forms a plurality of spaced apart elongate ribs and the shear plates 60 are bonded to one of those elongate ribs. Shear is transferred to the shear plates 60 via the bond (adhesion and mechanical) to provide the required flexural stiffness.

The metal layers 1, 2 are preferably structural steel though these may also be aluminium, stainless steel or other structural alloys in speciality applications where lightness, corrosion resistance, inertness or other specific properties are essential. The metal should preferably have a minimum yield strength of 240 MPa and an elongation of at least 20%. For many applications, especially ship building, it is essential that the metal is weldable.

The metal layers 1, 2 may be different metals which provide different functions. Examples are mild steel for strength at low cost, stainless steel for strength and resistance to chemical attack and aluminium for lightweight, good stiffness and strength.

The ductility of the elastomer at the lowest operating temperature must be greater than that of the metal layers, which is about 20%. A preferred value for the ductility of the elastomer at lowest operating temperature is 50%. The thermal coefficient of the elastomer must also be sufficiently close to that of the steel so that temperature variation across the expected operating range, and during welding, does not cause delimitation. The extent by which the thermal coefficients of the two materials can differ will depend in part on the elasticity of the elastomer but it is believed that the thermal expansion coefficient of the elastomer may be about 10 times that of the metal layers. The coefficient of thermal expansion may be controlled by the addition of fillers to the elastomer.

The bond strength between the elastomer and metal layers should be at least 1 MPa, preferably 6 MPa over the entire operating temperature range. This is preferably achieved by the inherent adhesiveness of the elastomer to steel but additional adhesives may be provided.

Additional requirements if the member is to be used in a ship building application, include that the tensile strength across the interface must be sufficient to withstand expected negative hydrostatic pressure and delaminating forces from steel connections. The form and elastomer must be hydrolytically stable to both sea and fresh water and if the member is to be used in an oil tanker must have chemical resistance to oils.

The elastomer therefore essentially comprises a polyol (e.g. polyester or polyether) together with an isocyanate or a di-isocyanate, chain extenders and fillers. Fillers are provided, as necessary, to reduce the thermal coefficient of the intermediate layer, reduce its cost and otherwise control the physical properties of the elastomer. Further additives, e.g. to control hydrophobicity or adhesion, and fire retardants may also be included.

The form 10 and intermediate layer 20 may be exposed (open) or enclosed. In cases where the form 10 and intermediate layer 20 materials are exposed, and where the welding is minimised or even eliminated altogether, the intermediate layer material must provide the additional required shear capacity between the plates and it must be resistant to the environment (e.g. UV resistant). Extra additives may be required for exposed materials to enhance fire resistance.

The ratio of the total thickness of the outer layers to the thickness of the elastomer, $(T_1+T_3)/T_2$, generally is in the range of from 0.1 to 2.5. The elastomer is preferably compact, i.e. has entrained air of less than about 25% by volume.

Coatings, e.g. for cosmetic or corrosion resistance reasons, may be applied to the outer surfaces of the metal layers either before or after fabrication of the laminate. Other coatings may also be provided to protect exposed elastomer.

The member of the present invention is substantially stronger and stiffer than a member with the same total thickness of metal that has no intermediate layer. This is because the member acts in an analogous manner to a box girder or I-beam with the intermediate layer performing the function of the web(s). To so function the intermediate layer itself and the bonds to the outer layers must be sufficiently strong to transfer the forces that will arise in use of the member.

A further advantage of the present invention, of particular benefit in ship building and bridge applications, is that the intermediate layer acts to prevent crack propagation between the inner and outer layer. The elasticity of the intermediate layer helps to prevent the propagation or growth of existing cracks. The composite structural laminate construction bends through a larger radius at support points or along the edges of loads, dissipating the bending strains, lessening the corresponding stress concentrations and the possibility of the formation of fatigue cracks.

The preferred method of fabricating a laminate member according to the invention is to position the two metal layers 1,2 in a spaced apart relation with the form 10 disposed between the two layers 1,2 and in contact with the two layers 1,2. In this way, the separation of the two layers is defined by the dimension of the form 10. The elastomer of the intermediate layer 20 is cast or injected (generally under pressure) directly into the remainder of the cavity formed by the two metal layers 1 and 2 not occupied by the form 10. The form may be bonded to the steel plates with bonding agents of elastic-compatible compounds with sufficient strength to hold the plates in place during the injection process until the elastomer is sufficiently cured.

During casting the plates 1,2 may be held at an incline to assist elastomer flow, or even vertical, though the hydrostatic head of the elastomer during casting should not be excessive and the flow of the displaced air should be optimised. The plates may also be fixed in place in the structure and filled with elastomer in-situ.

To enable welding of the member to other members or to an existing structure, is as necessary to leave a sufficient weld margin around the edges to ensure that elastomer and its bond to the steel plate are not damaged by the heat of welding. The width of the weld margin will depend on the heat resistance of the elastomer and the welding technique to be used but may be about 75 mm. If the elastomer is cast between the plates, the welding margin will need to be defined by elongate removable or cast in place spacers.

The number of injection and venting ports required will depend on the available equipment for pumping the components of the elastomer to provide minimum splash (ideally splash free), the volume, orientation and shape to be filled, the optimum locations to evacuate air (ensurance of no voids) and the gel time of the elastomer. The injection and venting ports should be situated in appropriate places for the use to which the member is to be put. If the member is to be used as a hull plate in a double-hull ship, the injection ports are ideally suited so as to face the inter-hull gap rather than the sea or cargo space. The injection ports are ideally quick disconnect ports, possibly with one-way valves, that can be ground off after casting. Injection and venting ports may be simple holes drilled into the metal face plates. These may also be sealed with metal plugs that are flush or made flush with the metal face plate. Plugs inserted in injection or venting ports should be made of a material that has galvanic characteristics compatible with the metal layers.

The injection process must be monitored to ensure even filling of the cavity without any back pressure which might cause swelling and uneven plate thickness. The injection can also be carried out using tubes that are withdrawn progressively as the cavity fills.

After manufacture and during the life of the laminate, it may be necessary to verify that the elastomer has correctly adhered to the metal layers. This can be done using ultrasound or gamma-ray techniques.

To repair damaged members, or if the elastomer has not properly adhered, the damaged region of the metal plate is sawn (cold cut) or flame cut and the elastomer is cut or gouged out, e.g. using a router or pressurised water (hydro blasting) until good elastomer is exposed and a weld margin is created. The exposed surface of the remaining elastomer must be sufficiently clean for new elastomer, cast in situ, to adhere.

The present invention has been described above in relation to both maritime and civil engineering applications and is especially applicable to those where significant in-plane and transverse loads are expected, where impact loads need to be resisted, where increased fatigue resistance or where resistance to crack propagation is desirable.

The invention claimed is:

1. A structural laminate member comprising:
a first metal layer having a first inner surface and a first outer surface;
a second metal layer having a second inner surface and a second outer surface, the second metal layer being spaced apart from said first metal layer;
a form, made up of a plurality of sub-sections, located between said first and second inner surfaces, wherein said subsections include alignment dimples which protrude from the surfaces of said sub-sections to contact with said first or second inner surfaces; and
an intermediate layer comprised of an elastomer located in the spaces between said first and second inner surfaces not occupied by said form and adhered to said first and second inner surfaces wherein said elastomer is compact and said form has a density lower than a density of the intermediate layer.

2. A structural laminate member according to claim 1, in which the first and second metal layers are bonded together by the intermediate elastomer layer without welding of intermediate metal plates.

3. A structural laminate member according to claim 1, wherein said sub-sections are elongate.

4. A structural laminate member according to claim 1, wherein said plurality of sub-sections are interconnected by interconnectors.

5. A structural laminate member according to claim 1, wherein the sub-sections of the form are not all the same shape.

6. A structural laminate member according to claim 1, wherein the sub-sections of the form are not all uniformly spaced.

7. A structural laminate member according to claim 1, wherein a plurality of forms extend substantially all the length of said member so that said intermediate layer forms a plurality of spaced-apart elongate ribs.

8. A structural laminate member according to claim 1, further comprising at least one shear plate generally perpendicular to said first and second layers and extending therebetween and bonded to said intermediate layer.

9. A structural laminate member according to claim 1, wherein said form is made of foam.

10. A structural laminate member according to claim 9, wherein said form is made of polyurethane (PU) foam.

11. A structural laminate member according to claim 9, wherein said form is made of polypropylene.

12. A structural laminate member according to claim 9, wherein said form is in partial contact with at least one of said first and second metal layers.

13. A structural laminate member according to claim 1, wherein said elastomer has a modulus of elasticity, E, greater than or equal to about 250 MPa and a ductility exceeding that of the metal layers.

14. A structural laminate member according to claim 13, wherein said elastomer has a modulus of elasticity greater than or equal to about 275 MPa.

15. A structural laminate member according to claim 1, wherein said first and second metal layers each has a thickness in the range of from about 2.0 to about 25 mm.

16. A maritime or civil engineering structure or vessel including at least one structural laminate member according to claim 1.

17. A structural laminate member according to claim 1, wherein there are continuous paths avoiding said form from the first inner layer to the second inner layer.

18. A structural laminate member comprising:
a first metal layer having a first inner surface and a first outer surface;
a second metal layer having a second inner surface and a second outer surface, the second metal layer being spaced apart from said first metal layer;
a form, made up of a plurality of sub-sections, located between said first and second inner surfaces, wherein said sub-sections are hollow; and
an intermediate layer comprised of an elastomer located in the spaces between said first and second inner surfaces not occupied by said form and adhered to said first and second inner surfaces wherein said elastomer is compact and said form has a density lower than a density of the intermediate layer.

19. A structural laminate member comprising:
a first metal layer having a first inner surface and a first outer surface;
a second metal layer having a second inner surface and a second outer surface, the second metal layer being spaced apart from said first metal layer;
a form, made up of a plurality of sub-sections that are interconnected by interconnectors, located between said first and second inner surfaces, wherein the cross-sectional area of said sub-sections is greater than the cross-sectional area of said interconnectors; and
an intermediate layer comprised of an elastomer located in the spaces between said first and second inner surfaces not occupied by said form and adhered to said first and second inner surfaces wherein said elastomer is compact and said form has a density lower than a density of the intermediate layer.

20. A structural laminate member comprising:
a first metal layer having a first inner surface and a first outer surface;
a second metal layer having a second inner surface and a second outer surface, the second metal layer being spaced apart from said first metal layer;
a form located between said first and second inner surfaces;
an intermediate layer comprised of an elastomer located in the spaces between said first and second inner surfaces not occupied by said form and adhered to said first and second inner surfaces wherein said elastomer is compact and said form has a density lower than a density of the intermediate layer; and
at least one shear plate generally perpendicular to said first and second layers and extending therebetween and bonded to said intermediate layer, wherein said at least one shear plate has through holes.

21. A structural laminate member comprising:
a first metal layer having a first inner surface and a first outer surface;
a second metal layer having a second inner surface and a second outer surface, the second metal layer being spaced apart from said first metal layer;
a form, made of foam, located between said first and second inner surfaces, wherein there are continuous paths avoiding said form from the first inner layer to the second inner layer; and
an intermediate layer comprised of an elastomer located in the spaces between said first and second inner surfaces not occupied by said form and adhered to said first and second inner surfaces wherein said elastomer is compact and said form has a density lower than a density of the intermediate layer.

22. A structural laminate member according to claim 21, wherein there are straight paths avoiding said form from the first inner layer to the second inner layer and said straight paths are substantially perpendicular to said first and second metal layers.

23. A structural laminate member according to claim 21, wherein additional load bearing metallic members are located between, but not welded to, said first and second inner surfaces.

24. A structural laminate member according to claim 23, wherein said elastomer is adhered to said additional members.

25. A structural laminate member comprising:
a first metal layer having a first inner surface and a first outer surface;
a second metal layer having a second inner surface and a second outer surface, the second metal layer being spaced apart from said first metal layer;
a form located between said first and second inner surfaces; and
an intermediate layer comprised of an elastomer located in the spaces between said first and second inner surfaces not occupied by said form and adhered to said first and second inner surfaces wherein said elastomer is compact and has tensile and compressive strengths of at least 2 MPa, and said form has a density lower than a density of the intermediate layer.

26. A structural laminate member comprising:
a first metal layer having a first inner surface and a first outer surface;
a second metal layer having a second inner surface and a second outer surface, the second metal layer being spaced apart from said first metal layer;
a form located between said first and second inner surfaces; and
an intermediate layer comprised of an elastomer located in the spaces between said first and second inner surfaces not occupied by said form and adhered to said first and second inner surfaces wherein said elastomer is compact and has a bond strength to said metal layers of at least 1 MPa, and said form has a density lower than a density of the intermediate layer.

27. A structural laminate member comprising:
a first metal layer having a first inner surface and a first outer surface;
a second metal layer having a second inner surface and a second outer surface, the second metal layer being spaced apart from said first metal layer by about 20 to about 250 mm;
a form located between said first and second inner surfaces; and
an intermediate layer comprised of an elastomer located in the spaces between said first and second inner surfaces not occupied by said form and adhered to said first and second inner surfaces wherein said elastomer is compact and said form has a density lower than a density of the intermediate layer.

28. A structural laminate member comprising:
a first metal layer having a first inner surface and a first outer surface;
a second metal layer having a second inner surface and a second outer surface, the second metal layer being spaced apart from said first metal layer;
a form located between said first and second inner surfaces; and
an intermediate layer comprised of an elastomer located in the spaces between said first and second inner surfaces not occupied by said form and adhered to said first and second inner surfaces wherein said elastomer is compact and said form has a density lower than a density of the intermediate layer and the ratio of a total thickness of the first and second metal layers to a thickness of the intermediate layer is in the range of from 0.1 to 2.5.

* * * * *